United States Patent [19]
Abe et al.

[11] Patent Number: 5,147,942
[45] Date of Patent: Sep. 15, 1992

[54] THERMOPLASTIC RESIN COMPOSITION

[75] Inventors: Hiroomi Abe; Taichi Nishio; Yasurou Suzuki; Takeshi Sanada; Masahiro Kakugo, all of Chiba, Japan

[73] Assignee: Sumitomo Chemical Company, Limited, Osaka, Japan

[21] Appl. No.: 476,687

[22] Filed: Feb. 8, 1990

[30] Foreign Application Priority Data

Feb. 9, 1989 [JP] Japan .................................. 1-31493

[51] Int. Cl.$^5$ ...................... C08G 65/48; C08L 71/12; C08L 77/00
[52] U.S. Cl. ..................................... 525/397; 525/68; 525/92; 525/132; 525/905
[58] Field of Search ................................ 525/397, 905

[56] References Cited
U.S. PATENT DOCUMENTS 4,315,086  2/1982  Ueno et al. .
4,873,276  10/1989  Fujii et al. .......................... 525/397

FOREIGN PATENT DOCUMENTS 0269748   6/1988  European Pat. Off. .
56-49753   5/1981  Japan .
59-66452   4/1984  Japan .
8700540   1/1987  PCT Int'l Appl. .
8808433  11/1988  PCT Int'l Appl. .
87005304  9/1987  World Int. Prop. O. .

Primary Examiner—Jacob Ziegler
Attorney, Agent, or Firm—Cushman, Darby & Cushman

[57]  ABSTRACT

Disclosed is a thermoplastic resin composition improved in low-temperature impact resistance and processability which comprises:

(A) 5-95% by weight of a polyamide resin which has a relative viscosity of 3.1–4.5 and has a ratio α of terminal amino group to terminal carboxyl group of $0 < \alpha \leq 0.99$, (B) 95-5% by weight of a modified polyphenylene ether resin, modified with a compound having at least one functional group in its molecule, or a mixture of said modified polyphenylene ether resin and a polyphenylene ether resin, and (C) 0-50 parts by weight of a rubber-like polymer per 100 parts by weight of (A)+(B).

4 Claims, No Drawings

THERMOPLASTIC RESIN COMPOSITION

The present invention relates to a thermoplastic resin composition which comprises a polyphenylene ether and a polyamide resin.

More particularly, it relates to a thermoplastic resin composition which comprises a modified polyphenylene ether resin and a polyamide resin and which has both good low-temperature impact resistance and good processability.

Polyphenylene ether (PPE) is a thermoplastic resin superior in mechanical properties, heat resistance, cold resistance, dimensional stability and the like, but polyphenylene ether alone is very poor in impact resistance and solvent resistance and also poor in processability due to its high viscosity.

On the other hand, polyamide resin is a thermoplastic resin which is superior in mechanical strength, solvent resistance, and processability, but is poor in impact resistance and heat resistance and besides is very poor in dimensional stability because of high water absorption.

Proposals have been made to blend both resins in order to make use of advantages of these resins and to offset their defects. However, mere blending of them causes loss of their good mechanical properties. Therefore, attempts have been made to improve the mechanical properties by enhancing dispersibility using various compatibilizing agents at the time of blending of polyphenylene ether resin and polyamide. These methods are disclosed in Japanese Patent Kokoku Nos. 60-11966 and 61-10494 and Japanese Patent Kokai Nos. 59-66452 and 56-49753. The thus obtained PPE/polyamide resin compositions are being applied to electrical and electronic fields, outer panel, engine parts and wheel cover of automobiles and so on since they are materials superior in mechanical properties, heat resistance, solvent resistance, processability, dimensional stability and moisture absorption.

However, with application to these wide variety of uses, the PPE/polyamide resin compositions are being required to have more excellent low-temperature impact resistance and processability. As an approach to meet these requirements, Japanese Patent Kokai Nos. 62-240354, 62-250050, and 63-10655 have proposed to use a polyamide having greater number of terminal amino group than terminal carboxyl group in the above thermoplastic resin composition whereby good impact resistance and appearance are obtained. However, such a composition is still not satisfactory in low-temperature impact resistance. Further, when proportion of amount of terminal amino group to that of terminal carboxyl group is great, melt viscosity markedly increases and processability much deteriorates and thus such composition cannot be said to be well balanced molding material.

Under the circumstances, molding materials well balanced in properties and processability (flowability) are demanded.

The object of the present invention is to provide a polyphenylene ether/polyamide resin composition improved in low-temperature impact resistance and processing flowability.

As a result of intensive research conducted by the inventors, it has been found that when a polyamide resin which has a molecular weight within a specific range and has more terminal carboxyl groups than terminal amino groups is used in a thermoplastic resin composition, low-temperature impact resistance is improved and besides processing flowability is also improved.

That is, the present invention relates to a thermoplastic resin composition excellent in low-temperature impact resistance and having good melt flowability which comprises:

(A) 5-95% by weight of a polyamide resin which has a relative viscosity of 3.1-4.5 and has a ratio $\alpha$ of terminal amino group to terminal carboxyl group of $0 < \alpha \leq 0.99$, (B) 95-5% by weight of a modified polyphenylene ether resin, modified with a compound having at least one functional group in its molecule, or a mixture of said modified polyphenylene ether resin and a polyphenylene ether resin, and (C) 0-50 parts by weight of a rubber-like polymer per 100 parts of the total of (A) and (B).

The polyamide resin, which is component (A), has the essential requirements that relative viscosity is 3.1-4.5 and the ratio $\alpha$ of terminal amino group to terminal carboxyl group is $0 < \alpha \leq 0.99$. If relative viscosity is less than 3.1, low-temperature impact resistance of the resin composition is insufficient and if it is more than 4.5, low-temperature characteristics of the resin composition is good, but melt flowability at molding is inferior. If the ratio $\alpha$ of terminal amino group to terminal carboxyl group is more than 0.99, low-temperature resistance is somewhat improved, but melt viscosity extremely increases resulting in much reduction of processability. If the ratio $\alpha$ is 0, superior mechanical properties cannot be obtained. Polyamide resin having a relative viscosity of 3.1-4.0 and ratio $\alpha$ of $0 < \alpha \leq 0.95$ is preferred because low-temperature impact resistance and flowability are well balanced, and polyamide resin having a relative viscosity of 3.1-4.0 and a ratio $\alpha$ of $0.2 \leq \alpha \leq 0.85$ is especially preferred.

The relative viscosity herein used means a value $\eta$ rel $= t_1/t_0$ wherein $t_1$ is flowing-down time of solution prepared by dissolving 1 gram of polyamide in 100 cc of 98% concentrated sulfuric acid which is measured by Ostwalt viscometer at 25° C. and $t_0$ is flowing-down time of 98% concentrated sulfuric acid per se at 25° C. (in accordance with JIS K6810).

The polyamide resin having the ratio $\alpha$ of the terminal groups controlled to the range as mentioned above can be obtained by adding an extra compound having a group which reacts with amino group such as a dicarboxylic acid at the time of polymerization. Alternatively, it can be obtained by allowing a polyamide after polymerized to react with a compound having a group which reacts with amino group.

The polyamide is at least one polyamide selected from aliphatic polyamides, thermoplastic aromatic copolyamides and aromatic hydrogenated copolyamides. Nonlimiting examples thereof are shown below:

Aliphatic polyamides: These can be prepared by combining equimolar saturated aliphatic dicarboxylic acid having 4-12 carbon atoms and aliphatic diamine having 2-12 carbon atoms, during which the ratio $\alpha$ of terminal amino group to terminal carboxyl group can be controlled by the above-mentioned methods.

Typical examples of aliphatic dicarboxylic acid used for preparation of the polyamide include adipic acid, pimelic acid, azelaic acid, suberic acid, sebacic acid and dodecanedioic acid and typical examples of aliphatic diamine include hexamethylenediamine and octamethylenediamine. Besides, these polyamides can be prepared by self-condensation of lactam.

As examples of polyamides, mention may be made of polyhexamethylene adipamide (nylon 66), polyhexamethylene azelamide (nylon 69), polyhexamethylene sebacamide (nylon 610), polyhexamethylene dodecanamide (nylon 612), poly-bis-(p-aminocyclohexyl)methanedodecanamide, polytetramethylene adipamide (46 nylon), polyamides produced by ring cleavage of lactam, namely, polycaprolactam (6 nylon) and polylauryl lactam. Furthermore, there may also be used polyamides prepared by polymerization of at least two amines or acids used in preparation of the above-mentioned polymers, for example, polymers prepared from adipic acid, sebacic acid and hexamethylenediamine. Blends of polyamides such as blend of 66 nylon and 6 nylon include copolymers such as nylon 66/6.

Preferable aliphatic polyamides used here are polyhexamethylene adipamide (66 nylon), polycaprolactam (6 nylon), and a blend of polyhexamethylene adipamide (66 nylon) and polycaprolactam (6 nylon).

Thermoplastic aromatic polyamides: These are copolyamides containing aromatic component such as polyhexamethyleneisophthalamide (nylon 6I). Such thermoplastic copolyamide containing aromatic component mean polyamides containing aromatic amino acid and/or aromatic dicarboxylic acid such as p-aminomethylbenzoic acid, p-aminoethylbenzoic acid, terephthalic acid, and isophthalic acid as main constituting components.

As diamine which is another constituting component of polyamide, mention may be made of hexamethylenediamine, undecamethylenediamine, dodecamethylenediamine, 2,2,4-/2,4,4-trimethylhexamethylenediamine, m-xylylenediamine, p-xylylenediamine, bis(p-aminocyclohexyl)methane, bis(p-aminocyclohexyl)propane, bis(3-methyl-4-aminocyclohexyl)methane, 1,3-bis(aminomethyl)cyclohexane, and 1,4-bis-(aminomethyl)cyclohexane. Further, isocyanates such as 4,4'-diphenylmethane diisocyanate and tolylene diisocyanate can be used in place of diamines.

Comonomer components used as required have no special limitation and examples thereof are units of lactams or ω-amino acid of 4-12 carbon atoms, compounds derived from aliphatic dicarboxylic acids of 4-12 carbon atoms and aliphatic diamines of 2-12 carbon atoms, for example, lactams and amino acids such as ε-caprolactam, ω-laurolactam, 11-aminoundecanoic acid and 12-aminododecanoic acid and salts of equimolar diamines as mentioned above and adipic acid, azelaic acid, or sebacic acid.

Typical examples of thermoplastic aromatic copolyamides comprising these components are copolyamide of p-aminomethylbenzoic acid and ε-caprolactam (nylon AMBA/6), polyamides comprising as main components 2,2,4-/2,4,4-trimethylhexamethylenediamine.terephthalate (nylon TMDT, TMDT/6I), polyamides comprising, as main components, hexamethylenediamine isophthalate and/or hexamethylenediamine.terephthalate and as comonomer component bis(p-aminocyclohexyl)methane.isophthalate and/or terephthalate, bis(3-methyl, 4-aminocyclohexyl)methane isophthalate and/or terephthalate or bis(p-aminocyclohexyl) propane.isophthalate and/or bis(p-aminocyclohexyl)propane.-terephthalate (nylon 6I/PACM I, nylon 6I/DMPACM I, nylon 6I/PACP I, nylon 6I/6T/PACM I/PACM T, nylon 6I/6T/DMPACM I/DMPACM T, nylon 6I/6T-/PACP I/PACP I), polyamides comprising, as main component, hexamethylenediamine.isophthalate or hexamethylenediamine.terephthalate and, as comonomer, ε-caprolactam, 12-aminododecanoic acid, hexamethylenediamine.adipate, bis(p-aminocyclohexyl)methane.adipate, or bis(3-methyl,4-aminocyclohexyl)methane.adipate (nylon 6I, 6I/6T, 6I/12, 6T/6, 6T/66, 6I/PACM 6, 6I/DMPACM 6), and polyamides comprising, as main component, bis(p-aminocyclohexyl)methane.isophthalate or bis(3-methyl,4-aminocyclohexyl) methane isophthalate and, as comonomer, hexamethylenediamine dodecanedioate or 12-aminododecanoic acid (nylon PACM I/612, nylon DMPACM I/12).

Aromatic nuclear hydrogenated copolyamides: These are alicyclic copolyamides obtained by using cyclohexane 1,4-dicarboxylic acid or cyclohexane 1,3-dicarboxylic acid obtained by nuclear hydrogenation of terephthalic acid or isophthalic acid in place of terephthalic acid or isophthalic acid which is acid component of the above-mentioned aromatic copolyamides. Besides, nuclear hydrogenated diamines, and diisocyanates, such as 4,4' diphenylmethane diisocyanate and tolylene diisocyanate may also be used as monomers.

Polyphenylene ether as a starting material for the modified polyphenylene ether resin of component (B) is a polymer obtained by oxidation polymerization of at least one phenol compound represented by the formula:

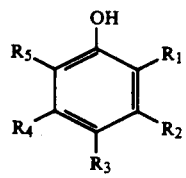

(wherein $R_1$, $R_2$, $R_3$, $R_4$ and $R_5$ each represent a hydrogen atom, a halogen atom, a substituted or unsubstituted hydrocarbon residue and one of them is a hydrogen atom) with oxygen or oxygen-containing gas using an oxidation coupling catalyst.

Examples of $R_1$, $R_2$, $R_3$, $R_4$ and $R_5$ in the above formula are hydrogen atom, chlorine atom, fluorine atom, bromine atom, iodine atom, methyl group, ethyl group, n- or iso-propyl group, pri-, sec- or t-butyl group, chloroethyl group, hydroxyethyl group, phenylethyl group, benzyl group, hydroxymethyl group, carboxyethyl group, methoxycarbonylethyl group, cyanoethyl group, phenyl group, chlorophenyl group, methylphenyl group, dimethylphenyl group, ethylphenyl group and allyl group.

Examples of the phenol compounds of the above formula are phenol, o-, m- or p-cresol, 2,6-, 2,5-, 2,4- or 3,5-dimethylphenol, 2-methyl-6-phenylphenol, 2,6-diphenylphenol, 2,6-diethylphenol, 2-methyl-6-ethylphenol, 2,3,5-, 2,3,6-, or 2,4,6-trimethylphenol, 3-methyl-6-t-butylphenol, thymol, and 2-methyl-6-allylphenol. Further, there may also be used copolymers of the phenol compounds of the above formula and other phenol compounds, for example, polyhydric hydroxy compounds such as bisphenol A, tetrabromobisphenol A, resorcin, hydroquinone, and novolak resin.

Among them, preferred are homopolymers of 2,6-dimethylphenol or 2,6-diphenylphenol and copolymers of major amount of 2,6-xylenol and minor amount of 3-methyl-6-t-butylphenol or 2,3,6-trimethylphenol.

Any oxidation coupling catalysts can be used for oxidation polymerization of the phenol compounds as far as they have polymerization ability. Typical examples thereof are cuprous salt/tert. amine such as cuprous chloride/triethylamine and cuprous chloride/pyridine; cupric salt/amine/alkali metal hydroxide such as cupric chloride/pyridine/potassium hydroxide; manganese salt/primary amine such as manganese chloride/ethanolamine and manganese acetate/ethylenediamine; manganese salt/alcoholate or phenolate such as manganese chloride/sodium methylate and manganese chloride/sodium phenolate; and cobalt salt/tert. amine.

With reference to reaction temperature of oxidation polymerization for obtaining polyphenylene, it has been known that products differ in properties when the polymerization is carried out at a temperature higher than 40° C. (high temperature polymerization) and at a temperature 40° C. or lower (low temperature polymerization). Either temperature may be used in the present invention.

The polyphenylene ether resin (B) further includes mixtures of the above-mentioned polyphenylene ether and a styrene polymer and the polyphenylene ether grafted with other polymers. These can be prepared, for example, by graft polymerizing styrene monomer and/or other polymerizable monomer in the presence of polyphenylene ether and organic peroxide (Japanese Patent Kokoku Nos. 47-47862, 48-12197, 49-5623, 52-38596 and 52-30991) or by melt-kneading the polyphenylene ether and polystyrene in the presence of a free-radical initiator (Japanese Patent Kokai No. 52-142799).

The above styrene resins are polymers comprising at least one polymer unit selected from styrene, α-methylstyrene, p-methylstyrene and the like. Examples of these polymers are polystyrene, rubber-reinforced polystyrene, poly α-methylstyrene, poly p-methylstyrene and styrene-acrylonitrile copolymer.

Amount of styrene resin mixed or grafted is desirably 200 parts by weight or less per 100 parts by weight of polyphenylene ether. If amount of styrene resin mixed or grafted is more than 200 parts by weight, heat resistance of the resulting thermoplastic resin composition is extremely deteriorated.

The modified polyphenylene ether resin modified with a compound having at least one functional group in its molecule used in the present invention is specifically a polyphenylene ether resin possessing in molecular chain a functional group reactable with polyamide when it is melt-mixed with polyamide. Reaction product comprising modified polyphenylene ether and polyamide produced by melt kneading the modified polyphenylene ether and polyamide markedly improves dispersibility of polyphenylene ether resin in polyamide in the thermoplastic resin composition of the present invention. Therefore, the resulting thermoplastic resin composition is superior to a resin composition of unmodified polyphenylene ether resin and polyamide in various properties such as mechanical properties and appearance.

Such modified polyphenylene ether resin modified with compound having at least one functional group in its molecule is obtained by allowing at least one compound selected from the group of the following compounds (a)–(c) to react with polyphenylene ether or polyphenylene ether resin.

(a) Compounds which have in molecule both (i) carbon-carbon double bond or carbon-carbon triple bond and (ii) carboxyl group, acid anhydride group, amino group, acid amide group, imide group, epoxy group, carboxylate group, isocyanate group, methylol group, group having oxazoline ring or hydroxyl group.

Examples of these compounds are maleic anhydride, maleic acid, fumaric acid, maleimide, maleic acid hydrazide, reaction products of maleic anhydride and diamine, for example, compounds having the formulas

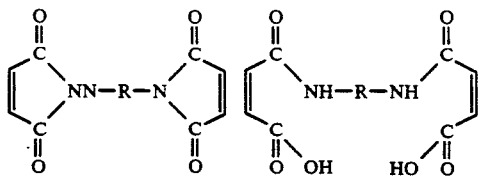

(wherein R is an aliphatic or aromatic group), methylnadic anhydride, dichloromaleic anhydride, maleic acid amide, natural fats and oils such as soybean oil, tung oil, caster oil, linseed oil, hempseed oil, cottonseed oil, sesame oil, rapeseed oil, peanut oil, camellia oil, olive oil, coconut oil, and sardine oil; epoxidized natural fats and oils such as epoxidized soybean oil; unsaturated carboxylic acids such as acrylic acid, butenoic acid, crotonic acid, vinylacetic acid, methacrylic acid, pentenoic acid, angelic acid, tiglic acid, 2-pentenoic acid, 3-pentenoic acid, α-ethylacrylic acid, β-methylcrotonic acid, 4-pentenoic acid, 2-hexenoic acid, 2-methyl-2-pentenoic acid, 3-methyl-2-pentenoic acid, α-ethylcrotonic, 2,2-dimethyl-3-butenoic acid, 2-heptenoic acid, 2-octenoic acid, 4-decenoic acid, 9-undecenoic acid, 10-undecenoic acid, 4-dodecenoic acid, 5-dodecenoic acid, 4-tetradecenoic acid, 9-tetradecenoic acid, 9-hexadecenoic acid, 2-octadecenoic acid, 9-octadecenoic acid, eicosenoic acid, docosenoic acid, erucic acid, tetracocenoic acid, mycolipenic acid, 2,4-pentadienoic acid, 2,4-hexadienoic acid, diallylacetic acid, geranic acid, 2,4-decadienoic acid, 2,4-dodecadienoic acid, 9,12-hexadecadienoic acid, 9,12-octadecadienoic acid, hexadecatrienoic acid, linolic acid, linolenic acid, octadecatrienoic acid, eicosadienoic acid, eicosatrienoic acid, eicosatetraenoic acid, ricinoleic acid, eleosteric acid, oleic acid, eicosapentaenoic acid, erucinic acid, docosadienoic acid, docosatrienoic acid, docosatetraenoic acid, docosapentaenoic acid, tetracosenoic acid, hexacosenoic acid, hexacodienoic acid, octacosenoic acid, and triacontanoic acid; and esters, acid amides and anhydrides of these unsaturated carboxylic acids; unsaturated alcohols such as allyl alcohol, crotyl alcohol, methylvinyl carbinol, allyl carbinol, methylpropenyl carbinol, 4-pentene-1-ol, 10-undecene-1-ol, propargyl alcohol, 1,4-pentadiene-3-ol, 1,4-hexadiene-3-ol, 3,5-hexadiene-2-ol, 2,4-hexadiene-1-ol, alcohols represented by the formulas $C_nH_{2n-5}OH$, $C_nH_{2n-7}OH$ or $C_nH_{2n-9}OH$ (n is a positive integer), 3-butene-1,2-diol, 2,5-dimethyl-3-hexene-2,5-diol, 1,5-hexadiene-3,4-diol, and 2,6-octadiene-4,5-diol; unsaturated amines such as ones where an OH group of these unsaturated alcohols is replaced by an —NH$_2$ group; glycidyl acrylate, glycidyl methacrylate, and allylglycidyl ether. Among them, preferred are maleic anhydride, fumaric acid, itaconic acid, himic anhydride, glycidyl acrylate, glycidyl methacrylate, and allylglycidyl ether. Moreover, those compounds which contain two or more functional groups of group (i) and two or more functional groups of group (ii) (which may be identical or different) can be used. These compounds may also be used in combination of two or more.

(b) Saturated aliphatic polycarboxylic acids represented by the formula and derivatives thereof:

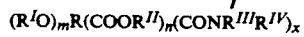

wherein;

R: a straight chain or branched chain saturated aliphatic hydrocarbon residue having 2–20 carbon atoms, preferably 2–10 carbon atoms, $R^I$: hydrogen atom, an alkyl, aryl, acyl or carbonyldioxy group having carbon atoms of 1–10, preferably 1–6, more preferably 1–4, and especially preferably hydrogen atom, $R^{II}$: a hydrogen atom or an alkyl or aryl group having carbon atoms of 1–20, preferably 1–10, $R^{III}$ and $R^{IV}$: a hydrogen atom or an alkyl or aryl group having carbon atoms of 1–10, preferably 1–6, more preferably 1–4, $m=1$, $n+s \geq 2$, preferably $n+s=2$ or 3, $n \geq 0$, $s \geq 0$, ($R^I$O) is located at $\alpha$-position or $\beta$-position of carbonyl group, and 2–6 carbon atoms are present between at least one pair of adjacent carbonyl groups.

These include ester compounds, amide compounds, anhydrides, hydrates and salts of saturated aliphatic polycarboxylic acids. Examples of saturated aliphatic polycarboxylic acids are citric acid, malic acid and agaricic acid. Examples of the ester compounds are acetyl ester and mono- or di-stearyl ester of citric acid. Examples of the acid amide compounds are N,N'-diethylamide, N,N'-dipropylamide, N-phenylamide, N-dodecylamide, and N,N'-didodecylamide of citric acid and N-dodecylamide of malic acid.

(c) Compounds represented by the formula: (I)-Z-(II) wherein (I) is a group represented by the formula: (X—CO—) (wherein X represents F, Cl, B, I, OH, OR, or —O—CO—R (wherein R represents H, an alkyl group or an aryl group)), (II) represents a carboxylic acid group, an acid anhydride group, an acid amide group, an imide group, a carboxylic acid ester group, an amino group or a hydroxyl group and groups (I) and (II) covalently link through a bond Z which is a hydrocarbon].

Examples of these compounds are chloroformylsuccinic anhydride, chloroethanoylsuccinic anhydride, trimellitic anhydride acid chloride, trimellitic anhydride, acetic anhydride and terephthalic acid chloride.

Amount of the compounds (a)–(c) having in molecule at least one functional group used for modification is 0.01–20 parts by weight, preferably 0.1–10 parts by weight per 100 parts by weight of the polyphenylene ether resin. If amount of the compounds is less than 0.01 part by weight, mechanical strength of the resulting thermoplastic resin composition is insufficient, and if it is more than 20 parts by weight, coloration of the composition or reduction in flowability of the composition occur.

For example, reaction of polyphenylene ether resin with the compounds for modification can be carried out using a suitable solvent in the presence or absence of a radical initiator or the reaction can be efficiently carried out by melt kneading them at a temperature at which the polyphenylene ether resin is molten in the absence of solvent. Any methods can be employed for the reaction.

The component (B) may be a mixture of the above-mentioned modified polyphenylene ether resin and an unmodified polyphenylene ether resin. Amount of the unmodified polyphenylene ether resin is 90 parts by weight or less per 100 parts of the mixture of the modified polyphenylene ether resin and the unmodified polyphenylene ether resin. If it is more than 90 parts by weight, the thermoplastic resin composition considerably deteriorates in its properties.

The rubber-like polymer (C) used in the present invention includes natural and synthetic polymer materials which are elastic at room temperature.

Examples of the rubber-like polymer (C) are ethylene propylene rubber, ethylene propylene non-conjugated diene rubber, ethylene butene rubber, propylene butene rubber, isoprene butylene rubber, polyisoprene, polybutadiene, styrene butadiene rubber, styrene-butadiene-styrene block copolymer, partially hydrogenated styrene-butadiene block copolymer, styrene-isoprene block copolymer, partially hydrogenated styrene-isoprene block copolymer, polystyrene grafted ethylene propylene rubber, polystyrene grafted ethylene propylene non-conjugated diene rubber, thiokol rubber, polysulfide rubber, polyurethane rubber, polyether rubber such as polypropylene oxide, epichlorohydrin rubber, polyester elastomer, polyamide elastomer, linear low-density polyethylene and mixtures thereof.

In addition, there may be used these rubber-like polymers modified with functional monomers, such as maleic anhydride grafted ethylene propylene rubber, maleic anhydride grafted styrene-butadiene-styrene block copolymer, maleic anhydride grafted partially hydrogenated styrene-butadiene block copolymer, maleic anhydride grafted partially hydrogenated styrene-isoprene block copolymer and glycidyl methacrylate grafted ethylene propylene rubber.

Furthermore, there may also be used those which are copolymerized with functional monomers, such as ethylene-acrylate-maleic anhydride copolymer, ethylene-acrylate-glycidyl methacrylate copolymer, ethylene-vinyl acetate-glycidyl methacrylate copolymer and mixtures thereof.

Among them, preferred are ethylene propylene rubber, ethylene butene rubber, styrene-butadiene block copolymer, partially hydrogenated styrene-butadiene block copolymer, styrene-isoprene block copolymer, partially hydrogenated styrene-isoprene block copolymer, linear low-density polyethylene having a density of 0.885–0.935, preferably 0.885–0.925, ethylene-methyl acrylate-maleic anhydride copolymer, ethylene-ethyl acrylate-maleic anhydride copolymer, ethylene-vinyl acetate-glycidyl methacrylate copolymer, ethylene-methyl acrylate-glycidyl methacrylate copolymer and mixtures thereof.

In the present invention, polyamide resin (A) and modified polyphenylene ether resin (B) are mixed in amounts of 5–95 % by weight and 95–5 % by weight, respectively.

If amount of component (B) is more than 95% by weight, chemical resistance and processability of the resin composition of the present invention considerably deteriorate, and if it is less than 5% by weight, satisfactory properties such as dimensional stability and heat resistance cannot be obtained. Mixing ratio of components (A) and (B) is preferably 20–80% by weight of component (A) and 80–20% by weight of component (B).

Component (C) is added in an amount of 0–100 parts by weight per 100 parts by weight of the total of components (A) and (B). If amount of component (C) exceeds 100 parts by weight, reduction of rigidity is great and inherent characteristics of the composition are lost.

The thermoplastic resin composition of the present invention can be obtained by mixing and melt kneading the above-mentioned components (A)–(C) by an ordinary method. Any sequence of mixing and melt kneading the components is possible.

The composition of the present invention may further contain ordinary additives such as filler, flame-retardant, plasticizer, antioxidant, and weathering agent.

The present invention will be explained in more detail by way of the following examples, but it should be noted that these examples are mere illustrative and never limit the invention.

In the examples and comparative examples, component (A) had the relative viscosity as shown in Table 1 and two kinds of nylon different in the ratio α of terminal amino group and terminal carboxyl group were prepared, and the ratio α of the composition was changed by changing mixing ratio of these two nylons.

Component (B) was obtained by mixing (2,6-dimethyl-1,4-phenylene)ether and compound for modification as shown in each example and then granulating the mixture by twin-screw extruder TEM 50 manufactured by Toshiba Machine Co., Ltd. at a cylinder temperature of 280° C.

As component (C), rubbers shown in respective examples were used.

A mixture of the above components was extruded by the above twin-screw extruder and cooled in a water tank and then pelletized by strand cutter. The resulting pellets were vacuum dried at 130° C. for 4 hours and molded into test pieces by injection molding machine IS220EN manufactured by Toshiba Machine Co., Ltd. under the conditions of cylinder temperature; 290° C., injection pressure: 1200 kg/cm$^2$ and mold temperature: 80° C.

The resulting test pieces were tested by the following methods to obtain data.

Izod impact strength: This was measured according to ASTM D256 using a test piece of 3.2 mm thick with notch.

M.F.R. (melt flow rate): This was measured according to ASTM D1238 under a load of 10 kg and at 280° C.

Falling weight impact strength: A test piece of flat plate of 3 mm thick was fixed by a holder of 2 inches in diameter and a dark having a head diameter of ½ inch was positioned on the test piece. A weight of 2 kg was dropped onto the dart, and drop height required for 50% breaking was measured and breaking energy was calculated.

EXAMPLES 1-6 and COMPARATIVE EXAMPLES 1-8

Nylon 6 as shown in Table 1 as component (A), a modified polyphenylene ether obtained by the reaction of poly(2,6-dimethyl-1,4-phenylene) ether with maleic anhydride as component (B) and a partially hydrogenated styrene-butadiene-styrene block copolymer rubber (SEBS; KRATON ® G1651 manufactured by Shell Chemical Co.) as component (C) were used.

Composition and results of measurement of properties are shown in Table 2.

EXAMPLE 7 and COMPARATIVE EXAMPLES 9-11

Nylon 66 as shown in Table 1 as polyamide of component (A), a modified polyphenylene ether obtained by the reaction of poly(2,6-dimethyl-1,4-phenylene)ether with maleic anhydride as component (B) and a maleic anhydride grafted ethylene propylene rubber obtained by the reaction of ethylene propylene rubber (EPR) with maleic anhydride as component (C) were used.

Composition and results of measurement of properties are shown in Table 3.

EXAMPLES 8-9 and COMPARATIVE EXAMPLES 12-14

Nylon 6 as shown in Table 1 as component (A), a modified polyphenylene ether obtained by the reaction of poly(2,6-dimethyl-1,4-phenylene) ether with citric acid as component (B) and a styrene-butadiene-styrene block copolymer rubber (SBS; KRATON ® TR1102 manufactured by Shell Chemical Co.) as component (C) were used.

Composition and results of measurement of properties are shown in Table 4.

EXAMPLES 10 and COMPARATIVE EXAMPLES 15-17

Nylon 6 as shown in Table 1 as component (A) and a modified polyphenylene ether obtained by the reaction of poly(2,6-dimethyl-1,4-phenylene) ether with maleic anhydride as component (B) were used and component (C) was not used.

Composition and results of measurement of properties are shown in Table 5.

EXAMPLES 11 and COMPARATIVE EXAMPLES 18-20

Nylon 6 as shown in Table 1 as component (A), a modified polyphenylene ether resin obtained by the reaction of a mixture of poly(2,6 -dimethyl-1,4-phenylene)ether and a high-impact polystyrene (ES-BLIGHT ® 500H manufactured by Japan Polystyrene Co.) with maleic anhydride as component (B) and the SBS used in Example 8 as component (C) were used. Composition and results of measurement of properties are shown in Table 6.

The feature of the present invention is in combination of modified polyphenylene ether and polyamide having a specific molecular weight and a specific ratio of terminal amino group and terminal carboxyl group and, if necessary, a rubber-like polymer may also be added thereto. As a result, the present invention has provided an excellent thermoplastic resin composition having both the low-temperature impact resistance and good processability.

TABLE 1

| Structure of nylon | | Relative viscosity | Concentration of terminal group ($\times 10^{-5}$ eg./g) | |
|---|---|---|---|---|
| | | | $-NH_2$ | $-COOH$ |
| Nylon 6 | $-(N-(CH_2)_5-C)_n-$ with H on N and O on C | 2.5 | 4.5 | 8.2 |
| | | " | 8.0 | 2.0 |
| | | 2.7 | 4.2 | 6.9 |
| | | " | 7.0 | 1.2 |
| | | 2.9 | 4.1 | 6.1 |
| | | " | 5.9 | 2.2 |
| | | 3.2 | 2.1 | 5.3 |
| | | " | 5.5 | 3.0 |
| | | 3.5 | 1.8 | 4.3 |
| | | " | 4.4 | 2.8 |
| | | 4.3 | 2.1 | 3.3 |
| | | " | 3.1 | 1.8 |
| Nylon 66 | $-(N-(CH_2)_6-N-C-(CH_2)_4-C)_n-$ | 2.4 | 6.3 | 9.0 |
| | | " | 8.9 | 6.8 |
| | | 3.3 | 3.4 | |
| | | " | 4.6 | |

TABLE 2

| | Composition | | | | Nylon | | MFR (g/10 min) | Izod impact strength (Kg cm/cm) | |
|---|---|---|---|---|---|---|---|---|---|
| | PPE | Maleic anhydride | SEBS | Nylon 6 | Relative viscosity | Terminal $-NH_2/-COOH$ ratio | | 23° C. | -30° C. |
| Example 1 | 50 | 0.5 | 20 | 50 | 3.2 | 0.5 | 42 | 80 | 22 |
| Example 2 | " | " | " | " | " | 0.7 | 23 | 80 | 27 |
| Example 3 | " | " | " | " | " | 0.96 | 14 | 81 | 27 |
| Comparative Example 1 | " | " | " | " | " | 1.5 | 1 | 80 | 30 |
| Example 4 | " | " | " | " | 3.5 | 0.7 | 22 | 63 | 34 |
| Example 5 | " | " | " | " | " | 0.9 | 10 | 60 | 34 |
| Comparative Example 2 | " | " | " | " | " | 1.3 | 2 | 62 | 36 |
| Example 6 | " | " | " | " | 4.3 | 0.7 | 11 | 48 | 36 |
| Comparative Example 3 | " | " | " | " | 2.7 | 0.7 | 53 | 75 | 14 |
| Example 4 | " | " | " | " | " | 0.9 | 33 | 73 | 16 |
| Example 5 | " | " | " | " | 2.9 | 0.7 | 40 | 76 | 13 |
| Example 6 | " | " | " | " | " | 0.9 | 22 | 75 | 19 |
| Example 7 | " | " | " | " | " | 1.0 | 17 | 76 | 19 |
| Example 8 | " | " | " | " | " | 1.5 | 5 | 75 | 20 |

TABLE 3

| | Composition | | | | Nylon | | MFR (g/10 min) | strength (Kg cm/cm) | |
|---|---|---|---|---|---|---|---|---|---|
| | PPE | Maleic anhydride | Maleic anhydride modified EPR | Nylon 66 | Relative viscosity | Terminal $-NH_2/-COOH$ ratio | | 23° C. | -30° C. |
| Example 7 | 50 | 0.5 | 15 | 50 | 3.3 | 0.7 | 21 | 48 | 19 |
| Comparative Example 9 | " | " | " | " | " | 1.3 | 4 | 48 | 21 |
| Example 10 | " | " | " | " | 2.4 | 0.7 | 80 | 42 | 9 |
| Example 11 | " | " | " | " | " | 1.3 | 20 | 45 | 11 |

TABLE 4

| | Composition | | | | Nylon | | MFR (g/10 min) | Izod impact strength (Kg cm/cm) | |
|---|---|---|---|---|---|---|---|---|---|
| | PPE | Citric acid | SBS | Nylon 6 | Relative viscosity | Terminal $-NH_2/-COOH$ ratio | | 23° C. | -30° C. |
| Example 8 | 50 | 0.5 | 10 | 50 | 3.2 | 0.7 | 31 | 48 | 12 |
| Example 9 | " | " | " | " | " | 0.9 | 20 | 50 | 11 |
| Comparative Example 12 | " | " | " | " | " | 1.5 | 3 | 50 | 14 |
| Example 13 | " | " | " | " | 2.5 | 0.9 | 53 | 52 | 6 |
| Example 14 | " | " | " | " | " | 1.5 | 15 | 52 | 8 |

TABLE 5

| | Composition | | | Nylon | | MFR | Izod impact strength (Kg cm/cm) | | Falling weight impact strength |
|---|---|---|---|---|---|---|---|---|---|
| | PPE | Maleic anhydride | Nylon 6 | Relative viscosity | Terminal $-NH_2$/ $-COOH$ ratio | (g/10 min) | 23° C. | −30° C. | −30° C. |
| Example 10 | 50 | 0.5 | 50 | 3.5 | 0.7 | 41 | 7 | 3 | 80 |
| Comparative Example 15 | " | " | " | " | 1.3 | 4 | 8 | 3 | 100 |
| Example 16 | " | " | " | 2.5 | 0.7 | 75 | 5 | 3 | 10 |
| Example 17 | " | " | " | " | 1.3 | 22 | 6 | 3 | 20 |

TABLE 6

| | Composition | | | | | Nylon | | MFR | Izod impact strength (Kg cm/cm) | |
|---|---|---|---|---|---|---|---|---|---|---|
| | PPE | HIPS | Maleic anhydride | Nylon 6 | SBS | Relative viscosity | Terminal $-NH_2$/ $-COOH$ ratio | (g/10 min) | 23° C. | −30° C. |
| Example 11 | 40 | 10 | 0.5 | 50 | 20 | 3.2 | 0.7 | 34 | 67 | 23 |
| Comparative Example 18 | " | " | " | " | " | " | 1.5 | 6 | 66 | 25 |
| Example 19 | " | " | " | " | " | 2.5 | 0.7 | 72 | 65 | 16 |
| Example 20 | " | " | " | " | " | " | 1.3 | 18 | 68 | 19 |

We claim:

1. A thermoplastic resin composition which comprises:
   (A) 5–95% by weight of a polyamide resin which has a relative viscosity of 3.1–4.5 and has a ratio $\alpha$ of terminal amino group to terminal carboxyl group of $0 < \alpha \leq 0.99$ and
   (B) 95–5% by weight of a modified polyphenylene ether resin, modified with a compound having at least one functional group in its molecule, or a mixture of said modified polyphenylene ether resin and a polyphenylene ether resin.

2. A thermoplastic resin composition according to claim 1, wherein the component (A) has a relative viscosity of 3.1–4.0 and has the ratio $\alpha$ of $0 < \alpha \leq 0.95$.

3. A thermoplastic resin composition according to claim 1, wherein the component (A) has a relative viscosity of 3.1–4.0 and has the ratio $\alpha$ of $0.2 \leq \alpha \leq 0.85$.

4. A thermoplastic resin composition according to claim 1, wherein the compound having at least one functional group in its molecule used for modification of polyphenylene ether resin (B) is at least one compound selected from the group consisting of:
   (a) compounds which have in molecule both (i) carbon-carbon double bond or carbon-carbon triple bond and (ii) carboxyl group, acid anhydride group, amino group, acid amide group, imide group, epoxy group, carboxylic acid ester group, isocyanate group, methylol group, group having oxazoline ring or hydroxyl group,
   (b) saturated aliphatic polycarboxylic acids represented by the formula (b) and derivatives thereof, $$(R^IO)_mR(COOR^{II})_n(CONR^{III}R^{IV})_s \qquad (b)$$

wherein

R: a straight chain or branched chain saturated aliphatic hydrocarbon group having carbon atoms of 2–20, $R^I$: a hydrogen atom, or an alkyl, aryl, acyl or carbonyldioxy group having carbon atoms of 1–10, $R^{II}$: a hydrogen atom, or an alkyl or aryl group having carbon atoms of 1–20, $R^{III}$ and $R^{IV}$: a hydrogen atom, or an alkyl or aryl group having carbon atoms of 1–10, $m = 1$, $n+s \geq 2$, $n \geq 0$, and $s \geq 0$; $(R^IO)$ is located at $\alpha$-position or $\beta$-position of carbonyl group, and 2–6 carbon atoms are present between at least one pair of adjacent carbonyl groups, and (c) compounds represented by the formula (c):

$$(I)-Z-(II) \qquad (c)$$

wherein (I) represents a group represented by the formula: (X—CO—) wherein X represents F, Cl, B, I, OH, OR, or —O—CO—R wherein R represents a hydrogen atom, an alkyl group or an aryl group; (II) represents a carboxylic acid group, an acid anhydride group, an acid amide group, an imide group, a carboxylic acid ester group, an amino group or a hydroxyl group, and groups (I) and (II) covalently link through a bond Z which is a hydrocarbon.

* * * * *